(12) United States Patent
Xu et al.

(10) Patent No.: US 8,030,788 B2
(45) Date of Patent: Oct. 4, 2011

(54) METHOD AND SYSTEMS FOR AN ENGINE STARTER/GENERATOR

(75) Inventors: Longya Xu, Columbus, OH (US); David Dimitri Karipides, Casstown, OH (US); Mohamed Abbas, Dayton, OH (US); Hao Huang, Troy, OH (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 12/347,616

(22) Filed: Dec. 31, 2008

(65) Prior Publication Data
US 2010/0164428 A1 Jul. 1, 2010

(51) Int. Cl.
*F02N 11/04* (2006.01)
(52) U.S. Cl. ........ 290/31; 290/46; 318/400.32; 318/800
(58) Field of Classification Search .................... None
See application file for complete search history.

(56) References Cited

U.S. PATENT DOCUMENTS

| | | | |
|---|---|---|---|
| 4,779,413 A | 10/1988 | Mouton | |
| 4,922,119 A | 5/1990 | Raad et al. | |
| 5,055,700 A | 10/1991 | Dhyanchand | |
| 5,559,419 A | 9/1996 | Jansen et al. | |
| 6,487,998 B1 | 12/2002 | Masberg et al. | |
| 6,844,707 B1 | 1/2005 | Raad | |
| 6,903,470 B2 | 6/2005 | Doherty et al. | |
| 7,064,514 B2 * | 6/2006 | Iwaji et al. | 318/801 |
| 7,233,125 B2 * | 6/2007 | Ramamoorthy et al. | 318/801 |
| 7,243,006 B2 * | 7/2007 | Richards | 700/286 |
| 7,271,564 B2 * | 9/2007 | Ramu | 318/254.1 |
| 7,737,651 B2 * | 6/2010 | De Four | 318/400.32 |
| 7,957,166 B2 * | 6/2011 | Schnetzka et al. | 363/56.03 |
| 2002/0041171 A1 | 4/2002 | Cho | |
| 2005/0281066 A1 * | 12/2005 | Wheeler et al. | 363/131 |
| 2006/0006829 A1 | 1/2006 | Anghel | |
| 2006/0279248 A1 | 12/2006 | Borisavljevic | |
| 2008/0093850 A1 | 4/2008 | Taneja et al. | |
| 2010/0194322 A1 * | 8/2010 | Negoro et al. | 318/454 |

FOREIGN PATENT DOCUMENTS

| | | |
|---|---|---|
| EP | 1953364 A1 | 8/2008 |
| WO | 2004019469 A1 | 3/2004 |

OTHER PUBLICATIONS

International Search Report and Written Opinion issued in connection with PCT/US2009/067497, Sep. 6, 2010.

* cited by examiner

*Primary Examiner* — Michael Zarroli
(74) *Attorney, Agent, or Firm* — David J. Clement, Esq.; Armstrong Teasdale LLP

(57) ABSTRACT

A method and system for an engine starter/generator is provided. The starter/generator system includes a three phase squirrel cage induction machine, a three phase inverter/converter electrically coupled to the three phase squirrel cage induction machine. The starter/generator system also includes a bidirectional DC-DC converter electrically coupled to the three phase inverter/converter, and a digital control board configured to sensorlessly determine a rotor angle from a plurality of phase currents to the induction machine during a start mode. During the start mode, logic in the digital control board configures the starter/generator system into a combination of an induction motor, a three phase DC-AC inverter, and a DC-DC boost converter, and during a generate mode, the logic in the digital control board configures the starter/generator system into a combination of an induction generator, a three phase AC-DC converter, and a DC-DC buck converter.

16 Claims, 9 Drawing Sheets

METHOD AND SYSTEMS FOR AN ENGINE STARTER/GENERATOR

BACKGROUND OF THE INVENTION

The field of the invention relates generally to a combination aircraft engine starter and aircraft electrical power generator, and more specifically, to an induction machine based sensorless aircraft engine starter/electrical power generator.

Typically, aircraft include a machine for use in starting an aircraft engine as well as for use in generating electrical power once the aircraft engine is operating. The electric machine is configured to receive externally supplied electrical power to drive the machine, which in turn, starts the aircraft engine. For example, the electric machine is used to begin the gas turbine cycle, and once the cycle is started, the aircraft engine is operating. Once the aircraft engine is operating, the aircraft engine is configured to power the electric machine, which facilitates electrical power generation.

Known aircraft engine starters include a direct current (DC) machine that includes brushes. An advantage of the brushed DC machine is a capability of providing both high torque for engine starting and high power for power generation at speeds two to three times the engine idle speed. However, disadvantages of the brushed DC machine are high maintenance and low life-span for some applications. Maintenance involves regularly replacing the brushes and springs which carry the electric current, as well as cleaning or replacing the commutator.

At least some known brushless methods to overcome the shortfalls mentioned above have been tried. One method is a permanent magnet brushless machine method, but the performance is rather disappointing due to an inability to accomplish both high torque at starting and high power generation over a three to one speed range with the competitive weight and size compared with those of a brushed machine. A second known method is a switched reluctance machine based approach. The performance of the switched reluctance machine is also unsatisfactory due to the same reason as the permanent magnet brushless machine approach. The third method is an induction machine based approach, which because of the method of implementation, the method did not achieve satisfactory performance due to issues that were are not addressed appropriately, thus previous induction machine based approaches suffer the same problem as the permanent magnet brushless machine and the switched reluctance machine. A fourth method is a synchronous wound field machine approach, which has had considerable success in achieving the two critical criteria of high starting torque capability and high power generation capability with a single machine. However the cost of the machine prohibits the method to be readily applied in many cost competitive aerospace applications, particularly for engines on business jets. Moreover, the synchronous wound field machine includes a rotating electronic assembly, the rotating rectifier in the shaft and has to have another machine, the exciter, which increases parts requirements and complexity that significantly reduces the reliability of the system. In addition, these methods also introduce a mechanical position sensor, which further reduces the reliability and further increases the cost of the engine.

BRIEF DESCRIPTION OF THE INVENTION

In one embodiment, a method and system for an engine starter/generator is provided. The starter/generator system includes a three phase squirrel cage induction machine, a three phase inverter/converter electrically coupled to the three phase squirrel cage induction machine. The starter/generator system also includes a dual bidirectional DC-DC converter electrically coupled to the three phase inverter/converter, and a digital control board configured to sensorlessly determine a rotor angle from a plurality of phase currents to the induction machine during a start mode. During the start mode, logic in the digital control board configures the starter/generator system into a combination of an induction motor, a three phase DC-AC inverter, and a DC-DC boost converter, and during a generate mode, the logic in the digital control board configures the starter/generator system into a combination of an induction generator, a three phase AC-DC converter, and a soft switching DC-DC buck converter.

In another embodiment, a method of controlling an engine starter/generator system for starting an engine and generating power using the engine includes during a start mode, boosting an input voltage using a DC-DC converter, inverting the boosted DC voltage into a three phase AC output that drives an induction motor configured to rotate the engine, and measuring two of the three phase currents, $i_a$ and $i_b$. The method also includes converting phase currents, $i_a$ and $i_b$ into $i_d$ and $i_q$, where $i_d$ is the current aligning with the rotor flux linkage and $i_q$ is the current perpendicular to the rotor flux linkage, controlling a field of an induction machine of the starter/generator system using $i_d$, and controlling a torque of an induction machine of the starter/generator system using $i_q$. During a generate mode, the method includes applying a three phase AC voltage output of the induction machine to the input of a the three phase converter, converting the three phase AC voltage into a DC voltage at a first voltage magnitude greater than a predetermined output voltage magnitude of the starter/generator system, and bucking the DC voltage down to the predetermined output voltage magnitude of the starter/generator system using a cascaded DC-DC converter.

In yet another embodiment, a brushless starter/generator (BS/G) and accessory gearbox (AGB) assembly for starting an engine and generating electrical power from the engine includes an induction electromagnetic machine including a squirrel cage rotor rotatable about an overhung gearbox shaft, a stator at least partially surrounding the rotor, and a housing enclosing the rotor and stator. The assembly also includes an engine accessory gearbox (AGB) coupled coaxially to the overhung gearbox shaft, and a dry cavity oil system configured to transfer heat generated in the BS/G to a lubricating oil system associated with the engine through at least one of convection and conduction to the AGB.

BRIEF DESCRIPTION OF THE DRAWINGS

FIG. 1 is a block diagram of brushless starter/generator (BS/G) system in accordance with an exemplary embodiment of the present invention;

FIG. 2 is a side elevation view of the starter/generator induction machine shown in FIG. 1 in accordance with an exemplary embodiment of the present invention;

FIG. 3 is a schematic block diagram of an oil circuit that may be used to cool the rotor and stator shown in FIG. 2 in accordance with an exemplary embodiment of the present invention;

FIG. 4 is a torque speed characteristics graph for variable frequency operation of the starter/generator induction machine shown in FIG. 1 in accordance with an exemplary embodiment of the present invention;

FIG. 5 is a schematic block diagram of the ICC unit shown in FIG. 1 in accordance with an exemplary embodiment of the present invention;

FIG. 6 is a schematic diagram of an algorithm for a rotor flux estimation method in accordance with an exemplary embodiment of the present invention;

FIG. 7 is a system block diagram of a start mode of the starter/generator induction machine in accordance with an exemplary embodiment of the present invention; and FIG. 8 is a system block diagram for the sensorless control of the starter/generator induction machine (in generate mode) in accordance with an exemplary embodiment of the present invention.

FIG. 9 is a schematic block diagram of ICC unit in accordance with an alternative embodiment of the present invention.

DETAILED DESCRIPTION OF THE INVENTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following detailed description illustrates embodiments of the invention by way of example and not by way of limitation. It is contemplated that the invention has general application to system and methodical embodiments of rotating machinery in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
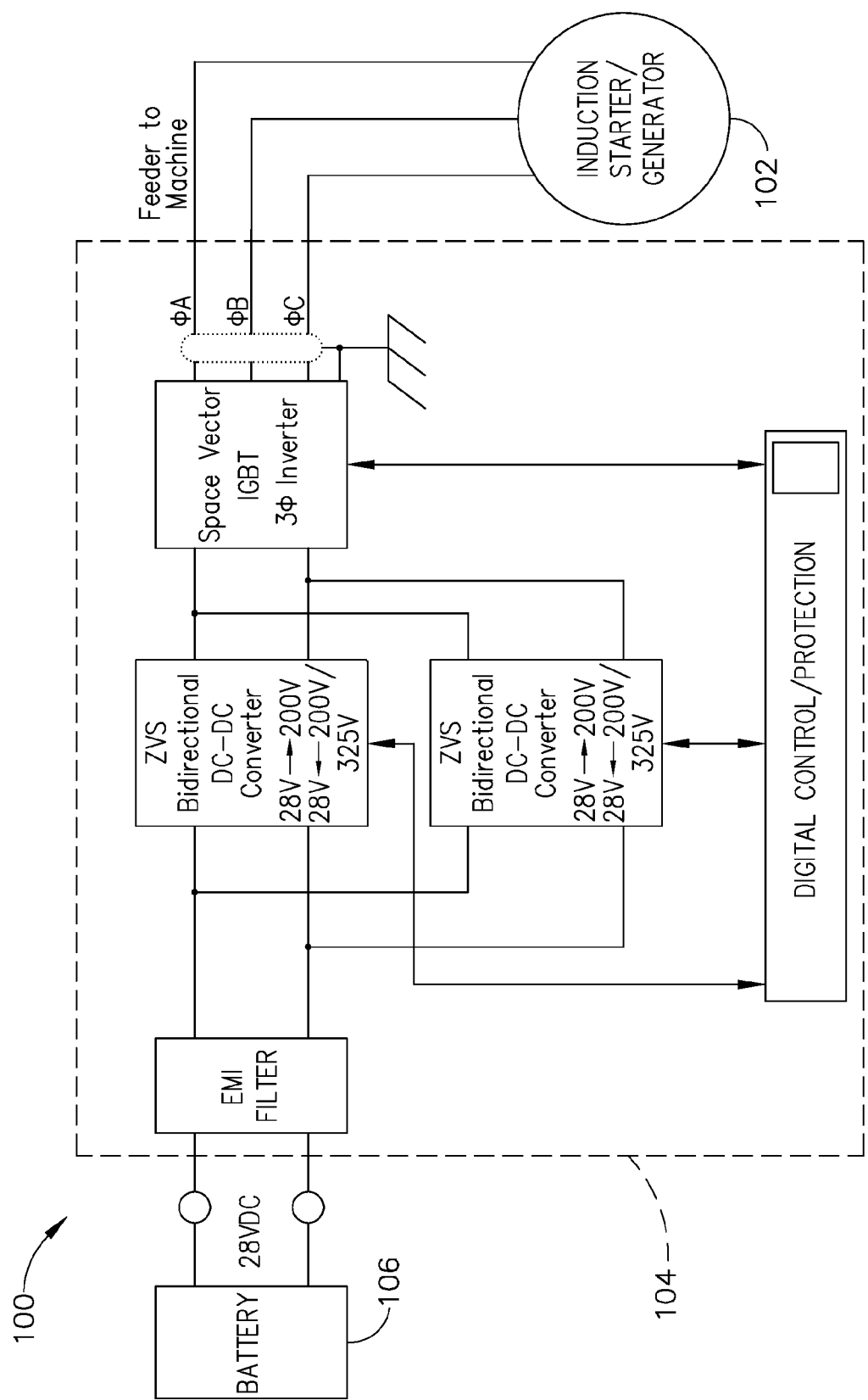
FIGS. 1-9 show exemplary embodiments of the method and systems described herein.

FIG. 1 is a block diagram of brushless starter/generator (BS/G) system 100 in accordance with an exemplary embodiment of the present invention. In the exemplary embodiment, system 100 includes a starter/generator induction machine 102 and an inverter/converter/controller (ICC) unit 104. In the exemplary embodiment, starter/generator machine 102 is a 4-pole, oil cooled induction machine rated at 47,000 rpm having a start speed of from approximately 0 to 29,140 rpm and a generator speed of from approximately 29,140 rpm to 47,000 rpm.

A topology of inverter/converter/controller (ICC) unit 104 is bidirectional, allowing power flow from a battery 106 to starter/generator induction machine 102 in start mode and from starter/generator induction machine 102 to for example, an aircraft 28 Vdc main bus in a generator mode, respectively. An architecture of starter/generator induction machine 102 and inverter/converter/controller (ICC) unit 104 permits fuselage installation of inverter/converter/controller (ICC) unit 104.

Figure 2:
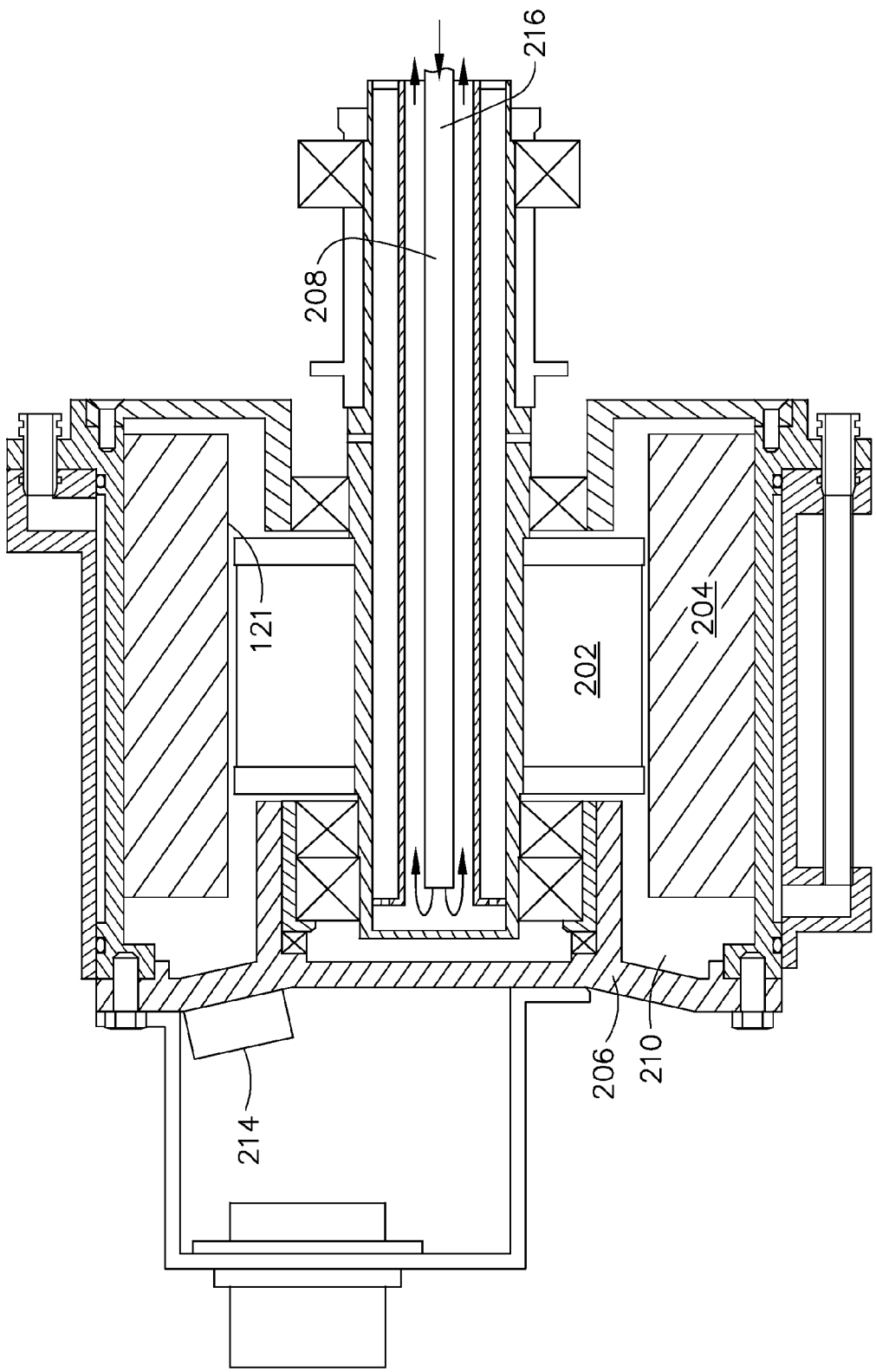

FIG. 2 is a side elevation view of starter/generator induction machine 102 in accordance with an exemplary embodiment of the present invention. In the exemplary embodiment, starter/generator induction machine 102 comprises an induction machine that is highly integrated with an engine accessory gearbox (AGB) (not shown in FIG. 2) for a low-weight and high-reliability system. Starter/generator induction machine 102 comprises a high-speed squirrel cage rotor 202, a stator 204, and a housing 206. Rotor 202 includes an overhung gearbox shaft 208 that provides for a relatively low weight and relatively small size design. A shared oil system, "dry cavity" construction eliminates gearbox oil contamination experienced in a "wet cavity/spray oil cooled" system when generator insulation and/or varnish materials age.

Stator 204 is the stationary part installed in the housing and includes a steel laminated slotted core 210 carrying multi-phase copper coils (not shown in FIG. 2). In the exemplary embodiment, the coils are configured to produce a fixed number of magnetic poles. The coil leads are connected to the power supply source. The squirrel cage rotor 202 is mounted on shaft 208 includes a steel laminated slotted core and aluminum or copper bars. All bars are short-circuited together at each end.

Rotor 202 is mounted on the overhung part of the AGB shaft (not shown in FIG. 2), becoming an integral part of the AGB. The construction of rotor 202 includes a core of steel laminations and a plurality of copper bars mounted circumferentially in the laminations. The rotor lamination material is optimized for the high physical stress environment. Shaft 208 is supported by the internal bearings the AGB and the BS/G.

A gap 212 between stator 204 and rotor 202 is sized to maximize efficiency while maintaining adequate mechanical clearance for temperature stresses. The construction of stator 204 includes steel core laminations and copper magnet wire coils.

Housing 206, which is externally mounted to the AGB, holds the stator 204, rotor 202 and an electrical connector 214. In the exemplary embodiment, housing 206 is fabricated of a magnesium alloy to achieve a very low weight.

BS/G 100 uses shared-oil from the engine and "dry cavity" cooling principles. The heat generated in BS/G 100 is removed by the engine lube oil system (not shown in FIG. 2) through convection and conduction to the AGB. Features of the shared oil dry cavity system include shared oil, which facilitates achieving a relatively light weight system (including gearbox, pump, filtration, and heat exchanger components). Additionally, no cooling oil is permitted to contact the insulation system used in BS/G 100 and no cooling oil is permitted in gap 212. The dry cavity system improves reliability over typical wet cavity designs in which oil is permitted to contact nonmetallic materials, such as insulation. In the dry cavity system, the insulation system is not degraded because there is no direct impingement of hot oil on the windings. Additionally, there is no eroded insulation material suspended in the oil, thus preventing oil contamination, which is especially important in a shared oil system. Oil is neither sprayed nor mixed with air, so there is no frothing, and an air separator is not required. The absence of 'free oil' also reduces windage losses associated with rotor 202. The rotor core is cooled by convection from the oil flowing through the center of shaft 208. The oil supplied from the AGB flows into shaft 208 inside an inner tube 216 integrated in shaft 208 and returns back to the AGB outside of inner tube 216.

Figure 3:
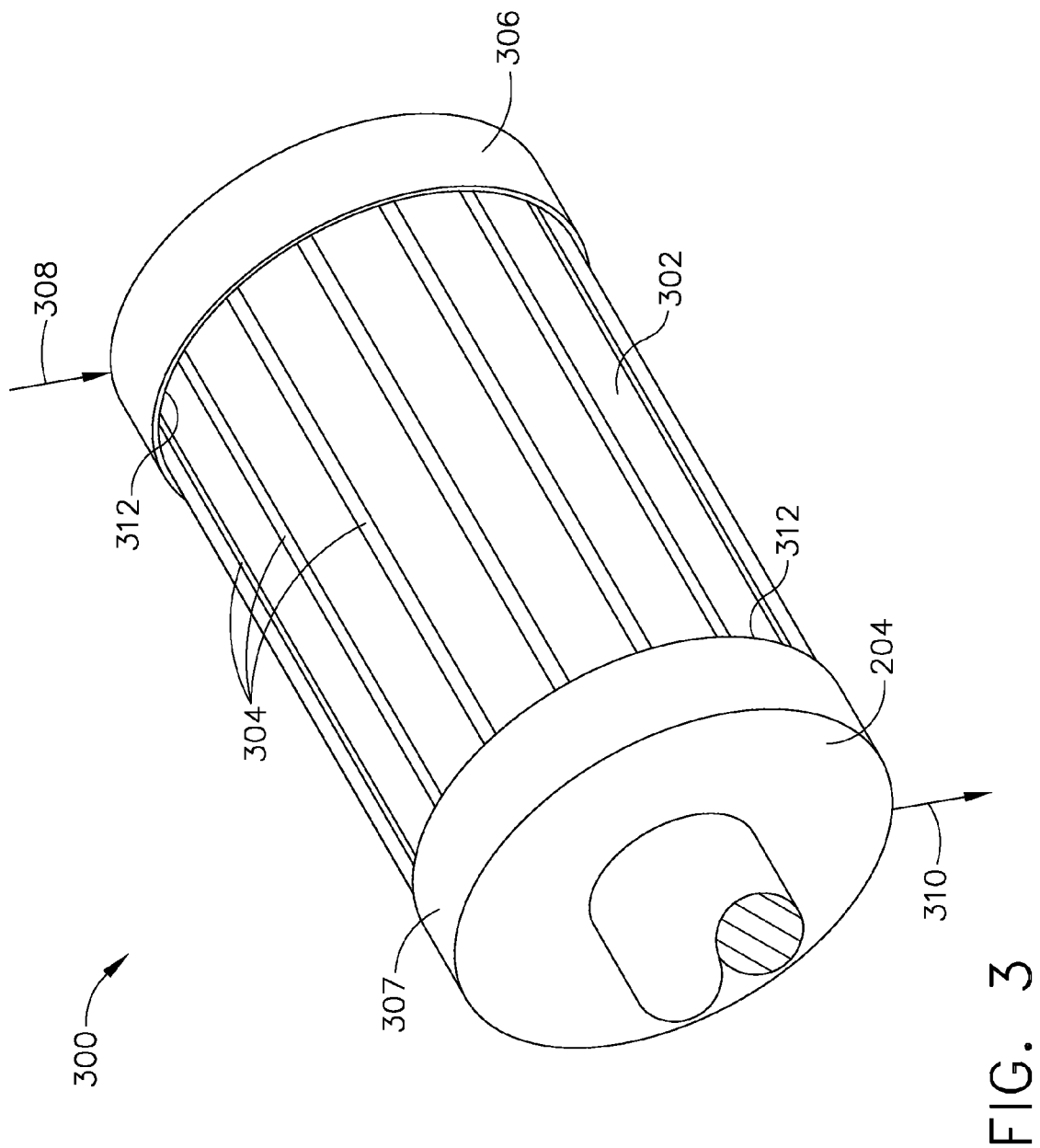

FIG. 3 is a schematic block diagram of an oil circuit 300 that may be used to cool stator 204 in accordance with an exemplary embodiment of the present invention. In the exemplary embodiment, stator oil circuit 300 incorporates an oil jacket 302 at least partially circumscribing an outer periphery of stator 204. Oil jacket 302 includes an extruded aluminum tube heat exchanger design with axial passages 304 for single-pass, parallel oil flow. A manifold 306 and 307 at each end provide for oil inlet 308 and oil outlet 310 distribution, respectively and are designed to supply uniform flow over the entire periphery. An o-ring seal 312 is provided at the outboard end of each manifold 306 to prevent oil leakage. Oil is supplied to drive end manifold 306 through an oil fitting mounted in a flange (not shown) of BS/G 100. Oil then flows axially through the parallel stator cooling passages 304 to return manifold 307 at the anti-drive end of BS/G 100; then exits approximately 180° away from oil inlet 308. By providing inlet 308 and outlet 310 approximately 180° apart, all oil paths through passages 304 are essentially the same length, and the oil distributes relatively evenly. The oil is returned to the AGB by the oil fitting located in the BS/G mounting flange. The stator core is also cooled by the conduction to the engine gearbox housing.

In the case of a three-phase starter/generator induction machine 102, the connection of the stator coils is either wye or delta. When the stator coils are connected into a constant voltage and frequency AC power supply they develop a rotating field in gap 212 that links with the rotor bars to produce the rotor back electromotive force (EMF). The rotating field in gap 212 rotates at a synchronous speed, $n_s$, determined by the power source frequency, f, and the induction machine number of poles, 2 p, where: $n_s$=60 f/p.

Because all rotor bars are short circuited, currents will circulate inside them developing a Lorenz force on the conductors and the rotor accelerates. As the rotor speed increases, the relative speed between the rotating field and the rotor, called absolute slip, decreases from $n_s$ at starting, to a very small value in the case of a no load condition. Under this condition, the rotor current is very small being only required to develop enough torque to overcome the rotor friction and windage losses. Stator 204 carries this current and the excitation current required to develop the rotating field. This no load current could reach a high percentage of the stator full load current depending on the machine design and in general the smaller the machine power rating the larger the no load percentage current and vice versa. As the load increases, the rotor speed decreases slightly to allow enough current in the rotor and stator to develop enough torque to overcome the load torque. The rotor speed under full load condition ranges from 95% to 99.5% of the synchronous speed depending on the rating and the design. In the exemplary embodiment, starter/generator induction machine 102 will always draw lagging power factor current because it has to provide its own excitation.

Figure 4:
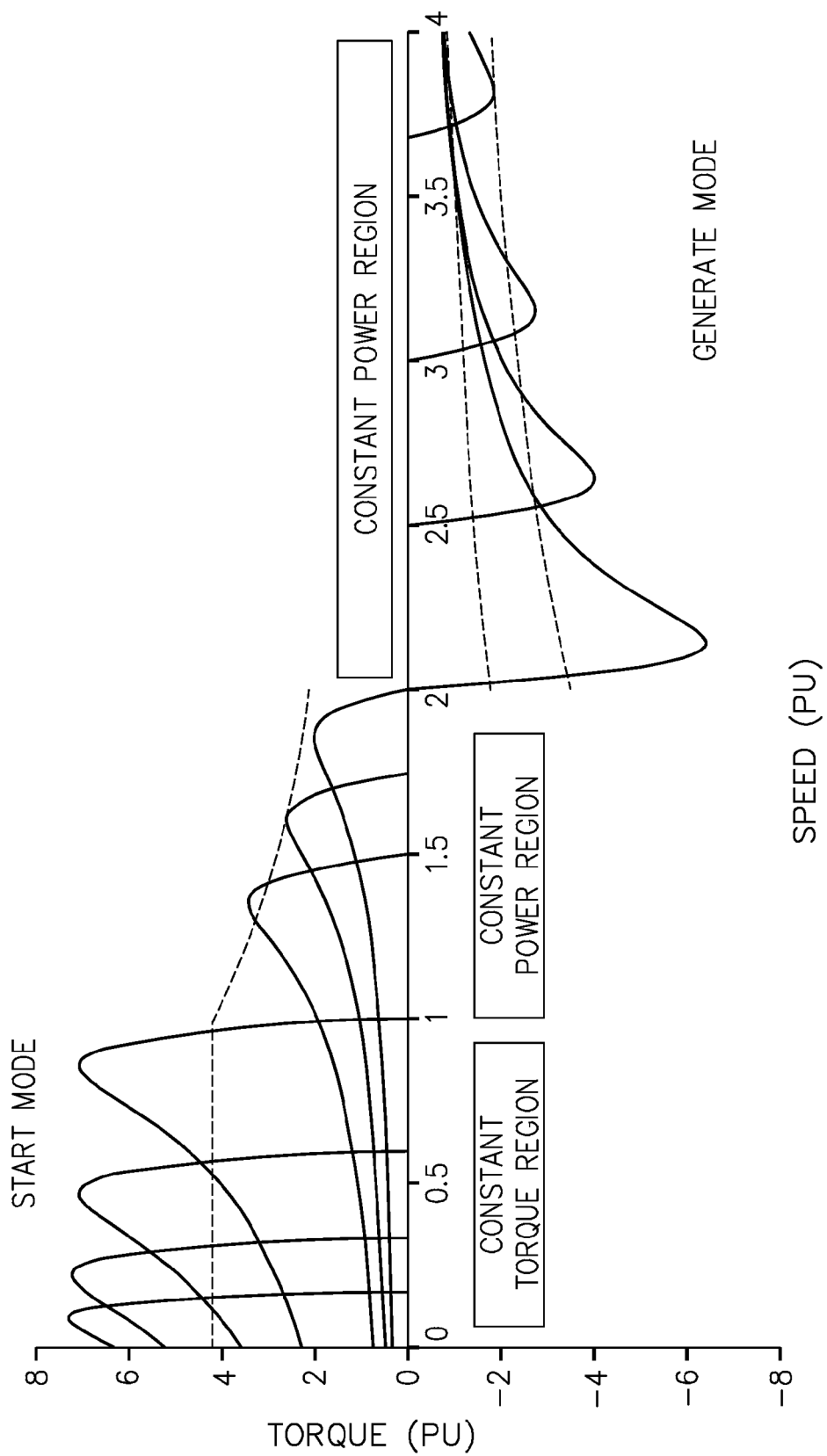

FIG. 4 is a torque speed characteristics graph for variable frequency operation of starter/generator induction machine 102 in accordance with an exemplary embodiment of the present invention. In the exemplary embodiment, graph 700 includes a constant torque region 702 and a constant power region 704.

In a start mode, a relatively high torque motor output is desired to meet an acceleration rate requirement. In the exemplary embodiment, starter/generator induction machine 102 is controlled to provide a maximum constant torque over a predetermined speed range by controlling the excitation current to keep a flux density in starter/generator induction machine 102 approximately equal to its saturation limit. Simply, the flux density in starter/generator induction machine 102 is proportional to $V_1$/f. If this ratio is maintained substantially constant, the torque can be maintained substantially constant until at some frequency the voltage reaches the power source voltage limit and this ratio can no longer be maintained. As the frequency increases, the ratio, $V_1$/f decreases, and the torque decreases while the power remains substantially constant. The rotor speed corresponding to this frequency is called base-speed, which is 1 pu speed in FIG. 4. The figure illustrates constant torque and constant power regions related to start mode and generate mode. As indicated in the figure, when the speed is from 0 to 2 pu and the torque is above zero, the machine is in start mode. Contractively, when the speed is from 2 to 4 pu and the torque is below zero, the machine is in generate mode. As mentioned, the constant power region occurs after the rotor speed reaches the based speed. Obviously, the region includes partial start mode and full generate mode. According to the convention used in this paper, power in start mode is positive while power in generate mode is negative.

It can be analytically shown that the maximum torque developed by starter/generator induction machine 102 is proximately proportional to V1 2/x (where, VI is machine voltage and x is leakage reactance), which indicates overload conditions at higher speed (higher than base speed) can not be achieved unless the voltage is increased to extend constant torque region 702 or reduce the leakage reactance of the machine. In one embodiment, starter/generator induction machine 102 is over-sized, increasing the stack length or the rotor OD and reducing the number of turns. In another embodiment, starter/generator induction machine 102 includes 2 p poles during the start mode and p poles during overload conditions. In the exemplary embodiment, a power converter stage is coupled between the inverter and the battery bus to achieve a higher voltage to raise the voltage.

Figure 5:
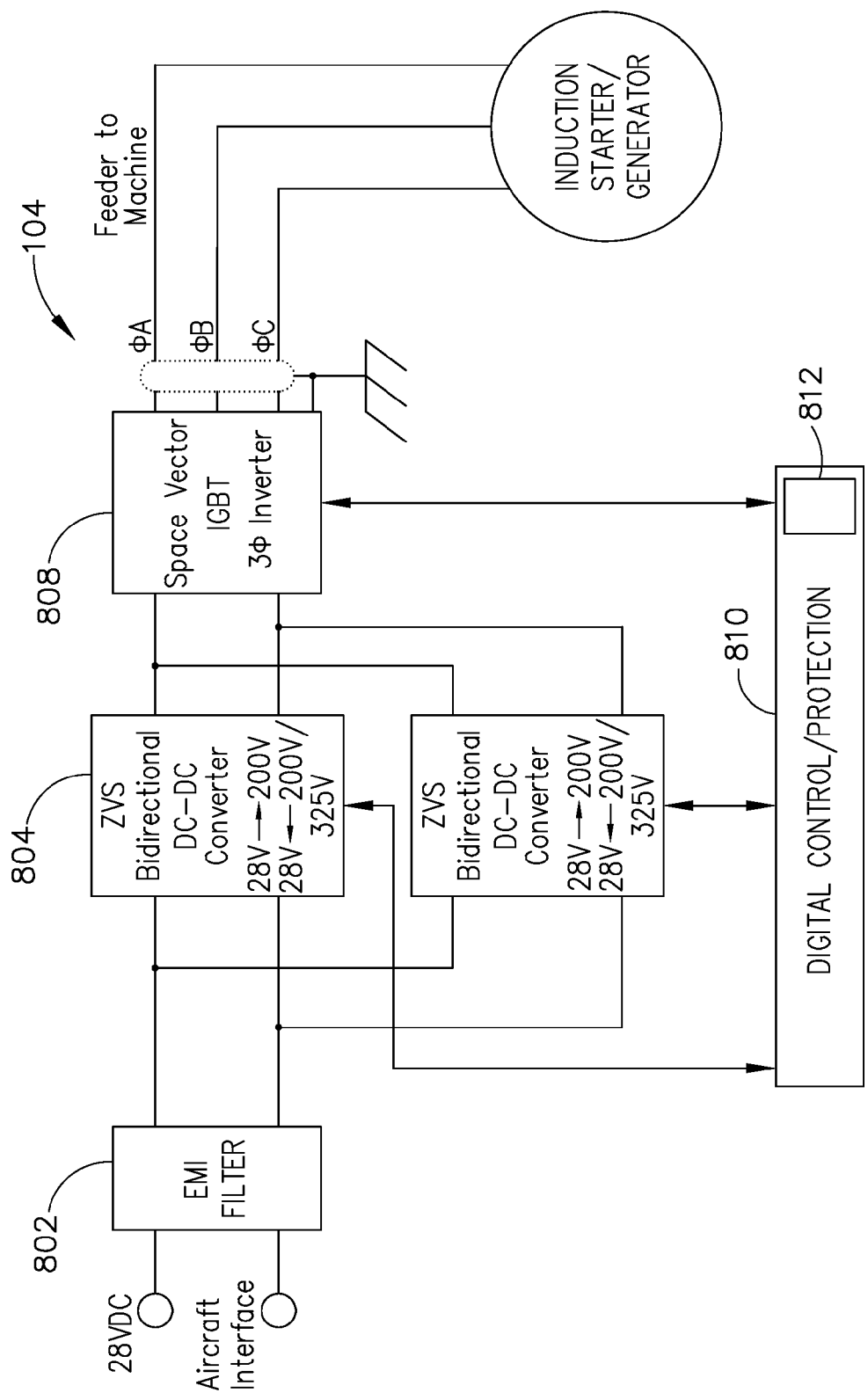

FIG. 5 is a schematic block diagram of ICC unit 104 in accordance with an exemplary embodiment of the present invention. In the exemplary embodiment, ICC unit 104 includes an electromagnetic interference (EMI) filter 802, a bidirectional converter 804, a high frequency isolation transformer and an IGBT 3-phase inverter 808. EMI filter 802 provides the filtering to minimize the EMI susceptibility during start mode as well as generate mode. Bidirectional converter 804 includes two interleaved converters, which are phase shifted from each other. This arrangement of the interleaved converters minimizes the voltage ripple and increases ripple frequency. With lower ripple frequency, the required filtering is significantly reduced resulting in lower weight and size of EMI filter 802, improving power quality. A control board 810 includes a digital signal processor 812 for synchronized space vector pulse width modulation (SVPWM) and protection. A gate driver board 814 and power supply 816 may be provided as stand-alone components or may be incorporated into control board 810 or other component of ICC unit 104.

In the exemplary embodiment, EMI filter 802 is isolated in a separate compartment from the remaining electrical circuits to minimize noise interference and provide EMI immunity. The dual parallel converter stages are interleaved by appropriate gate driver control to minimize the ripple voltage and double the ripple frequency. Such configuration tends to permit reducing a component weight and size of EMI filter 802 while improving the power quality.

During generate mode, zero voltage switching for the converter stage power switches facilitates higher bandwidth for the switches and thereby significant improvement in the system dynamic performance. Control board 810 provides advanced space vector pulse width modulation (SVPWM) for controlling three-phase insulated gate bipolar transistor (IGBT) switches during the generate and start modes.

ICC unit 104 includes a thermal clad substrate for thermal management. The thermal clad substrate minimizes the thermal impedance and conducts the heat more efficiently and effectively compared to standard printed wiring circuit boards. The thermal clad substrate configuration provides for an efficient mechanical packaging and a relatively higher power density. The power switches are mounted on thermal clad substrate type circuit board. The gate driver boards are staggered above the power switches to minimize the wire lengths to the gates.

The coldplate/heatsink forms a part of the main structure for the chassis. A thermal interface material is placed between the coldplate and the power substrate. The power substrate is an insulated metal substrate (IMS) with typically a copper base material for good heat transfer. An FR4 based circuit card assembly is positioned directly above the IMS and contains interface and driver circuits for the power devices.

Bi-directional converter 804 acts as a boost-converter during the start up stage, converting the battery 28 Vdc power into high voltage at 200-230 Vdc. This high voltage is isolated from the battery power through the isolation step-up transformer in bidirectional converter 804. During start mode, ICC unit 104 acts as a current source inverter. The high DC voltage from the output stage of bidirectional converter 804 is fed to IGBT 3-phase inverter 808 and SVPWM is used to control the IGBT switches, providing variable 3-phase AC voltage and frequency to starter/generator induction machine 102. The starting torque of starter/generator induction machine 102 is controlled by the voltage and frequency of bidirectional converter 804, which improves the battery energy utilization by controlling the battery current required during start mode. IGBT 3-phase inverter 808 includes the FPGA/DSP based control algorithm for SVPWM of the IGBT switches.

During a generate mode IGBT 3-phase inverter 808 acts as an induction generator powered by the engine. When starter/generator induction machine 102 speed reaches a minimum generate-mode speed, the power flow changes direction and starter/generator induction machine 102 acts as a generator, powering 3-phase inverter 808. 3-phase inverter 808 acts as a 6-pulse diode bridge converting starter/generator induction machine 102 3-phase voltage into 200-325 Vdc. 3-phase inverter 808 DC voltage is fed to bidirectional converter 804, which acts as a buck-converter converting high input DC voltage into regulated 28 Vdc. The output from bidirectional converter 804 passes through EMI filter 802 to provide 28 Vdc power to the aircraft DC bus. By using zero voltage switching (ZVS), the system operates at high efficiency, high switching frequency and low switching losses. This converter topology also improves the bandwidth and dynamic response of the converter. Dual inter-leaved converter stages results in lower 28 Vdc ripple and twice the ripple frequency. This significantly reduces the filter weight and size, improving power quality.

Figure 6:
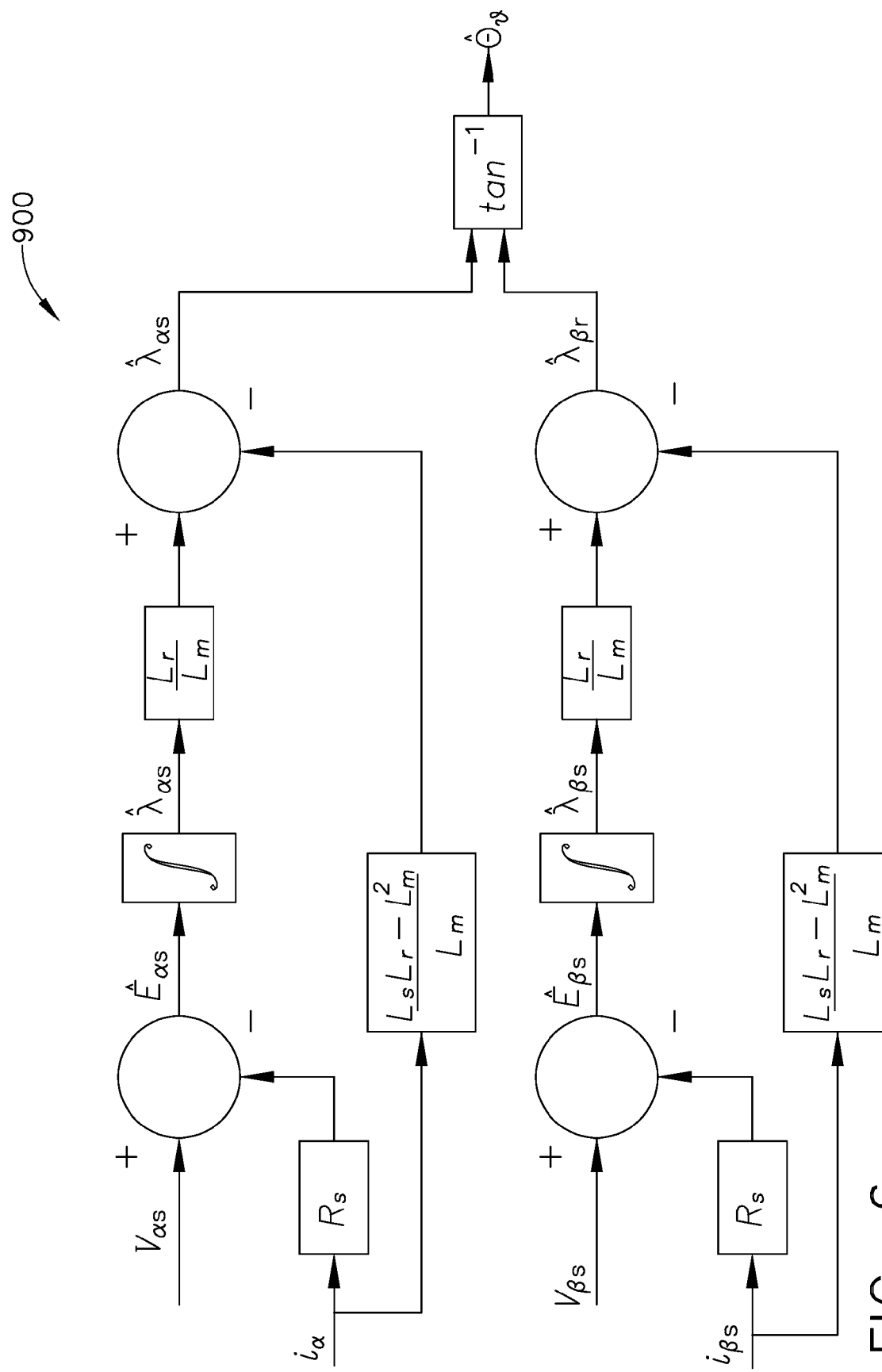
Figure 9:
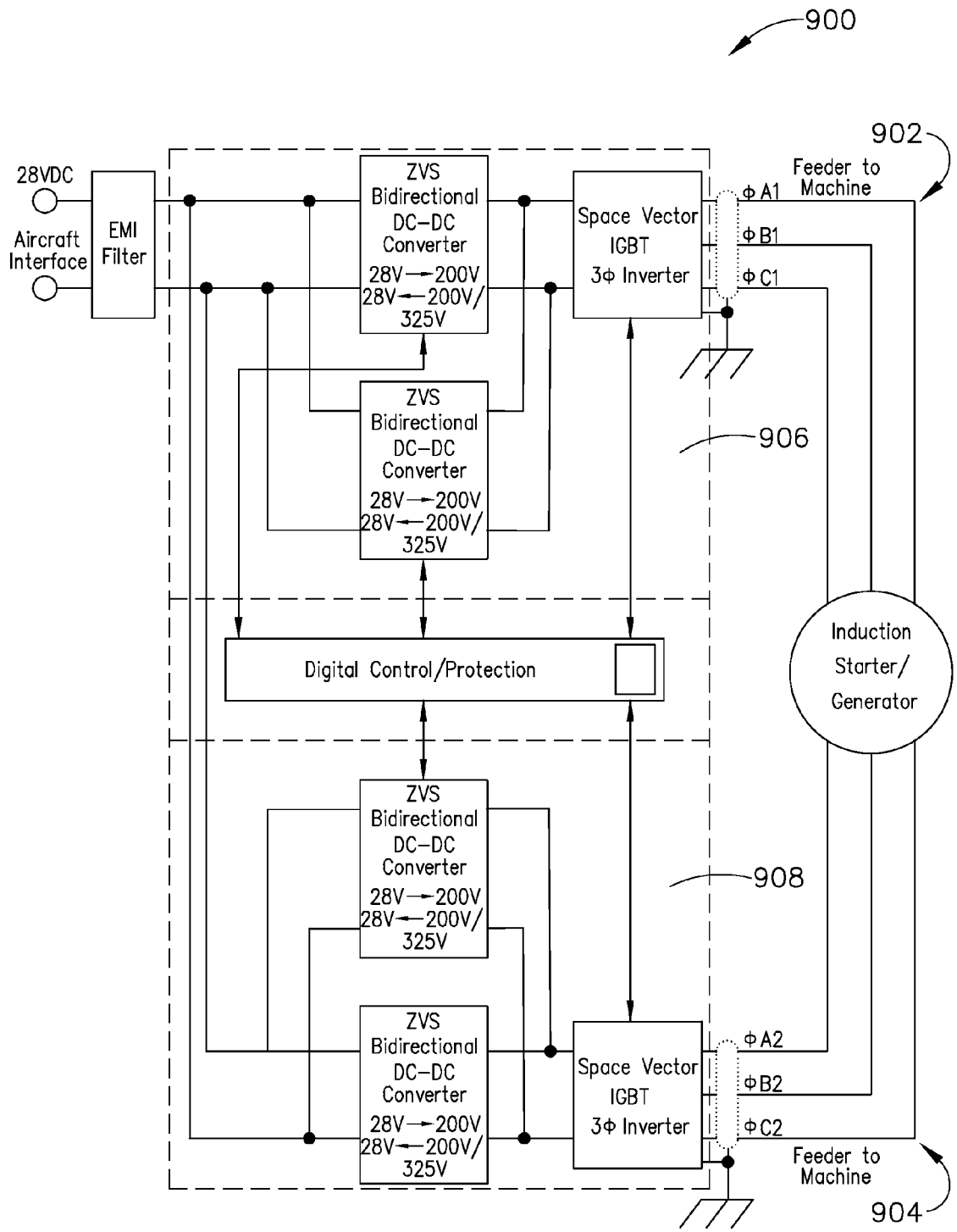

FIG. 6 is a schematic diagram of an algorithm for a rotor flux estimation method 900 in accordance with an exemplary embodiment of the present invention. In the exemplary embodiment, indirect field orientation (IFO) vector control is used during start mode operation. IFO ensures that the torque and flux are controlled independently. The voltage-model flux-observer principle has been designed to estimate the rotor flux angle and from the rotor flux angle the rotor position is determined. In FIG. 9:

$R_s$ represents the stator resistance;
$L_s$ represents the stator self inductance;
$L_r$ represents the rotor self inductance;
$\mu\alpha s$; the stationary $\alpha$-axis voltage
$\mu\beta s$ represents the stationary $\beta$-axis voltage;
$i\alpha s$ represents the stator currents in $\alpha$-axis;
$i\beta s$ represents the stator currents in $\beta$-axis;
$\hat{\theta}_{\lambda s}$; Estimated rotor flux angle;
$\hat{E}_{\alpha s}$; Estimated back-EMF in $\alpha$-axis;
$\hat{E}_{\beta s}$; Estimated back-EMF in $\beta$-axis;
$\hat{\lambda}_{\alpha s}$; Estimated stator flux linkages in $\alpha$-axis;
$\hat{\lambda}_{\beta s}$; Estimated stator flux linkages in $\beta$-axis;
$\hat{\lambda}_{\alpha r}$; Estimated rotor flux linkages in $\alpha$-axis,
$\hat{\lambda}_{\beta r}$; Estimated rotor flux linkages in $\beta$-axis.

Figure 7:
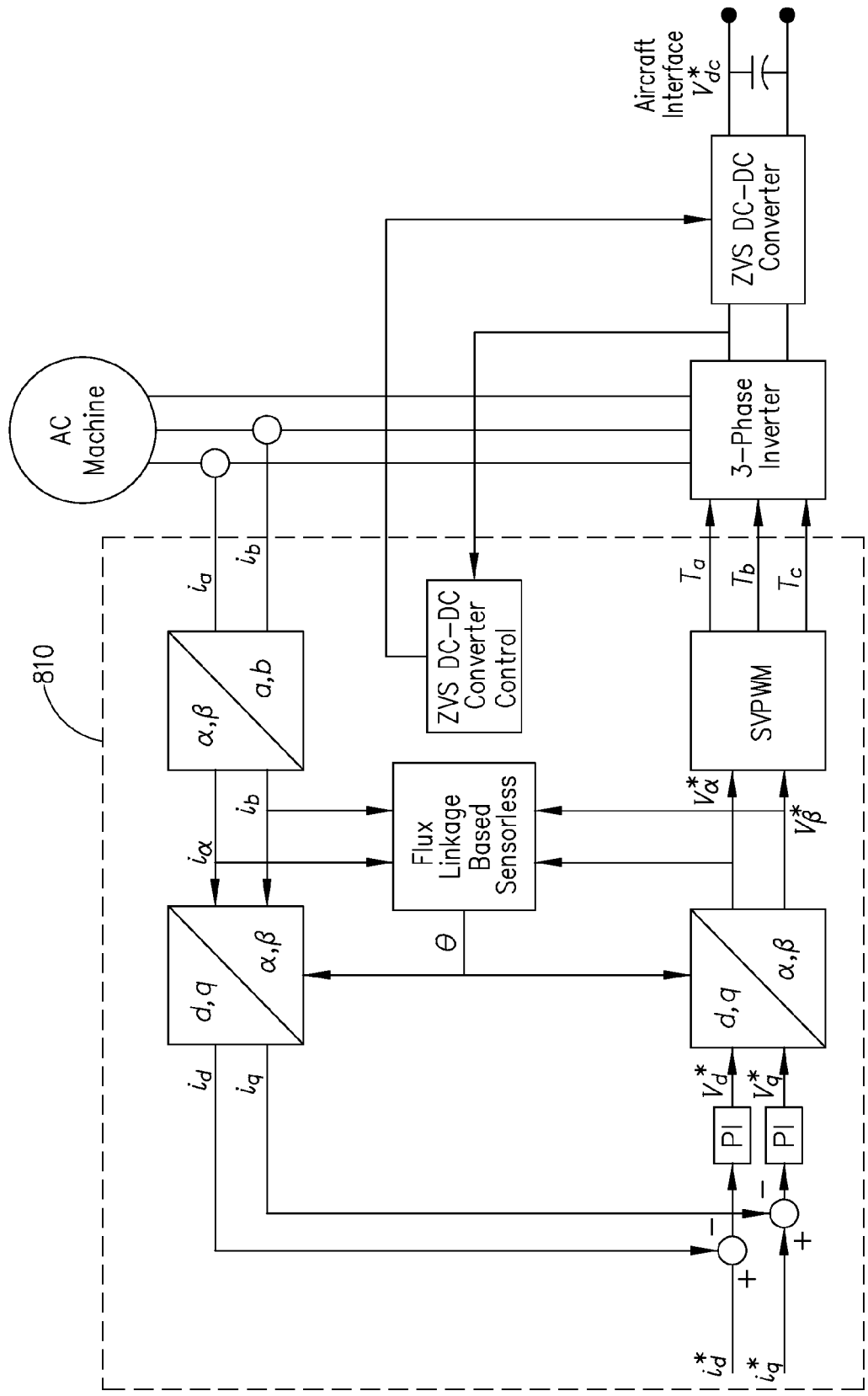

FIG. 7 is a system block diagram of a start mode of starter/generator induction machine 102 in accordance with an exemplary embodiment of the present invention. During start mode, starter/generator induction machine 102 provides sufficient torque to overcome the engine drag torque and to accelerate the engine. The starting torque of starter/generator induction machine 102 will plateau and then begin to drop after the engine is fired. In the start mode operation of starter/generator induction machine 102 the input voltage is first boosted to a higher, desirable voltage through a DC-DC converter. The gating of the boost converter is provided by the digital control board. The benefit of the voltage booster here is to reduce the current in the cascaded three phase inverter, and the cable between the DC-AC inverter and the three phase induction machine. Controlled by the digital control board, the inverter inverts the boosted DC voltage into three phase AC outputs that drive the induction motor. Digital control board 810 measures two of the three phase currents, $i_a$ and $i_b$, and converts the per phase quantities into $i_d$ and $i_q$, where $i_d$ is the current aligning with the rotor flux linkage and $i_q$ is the current perpendicular to the rotor flux linkage. The great advantage of this conversion is to provide an optimal way to control an induction machine like a brush DC machine, i.e., $i_d$ controls the field of the machine just like controlling the current of the field winding ala brush DC machine, while $i_q$ controls the torque of the machine just like controlling the current of the armature winding of the brush DC machine. The orthogonality of the two currents allows the digital control board to optimize the output torque of the induction machine, permitting maximum efficiency of the system. The conversion requires the flux linkage position, so called rotor angle, to realize the transformation from $i_a$ and $i_b$ to $i_d$ and $i_q$. Conventionally, the rotor angle is obtained through a mechanical position sensor mounted on the shaft of the machine. In the exemplary sensor less approach, the rotor position is determined using currents, $i_\alpha$ and $i_\beta$, and the voltage commands, $v^*_\alpha$ and $v^*_\beta$ using a flux linkage method. The entire approach for engine starting uniquely provides minimum currents and maximum efficiency performance of the system during start mode.

Figure 8:
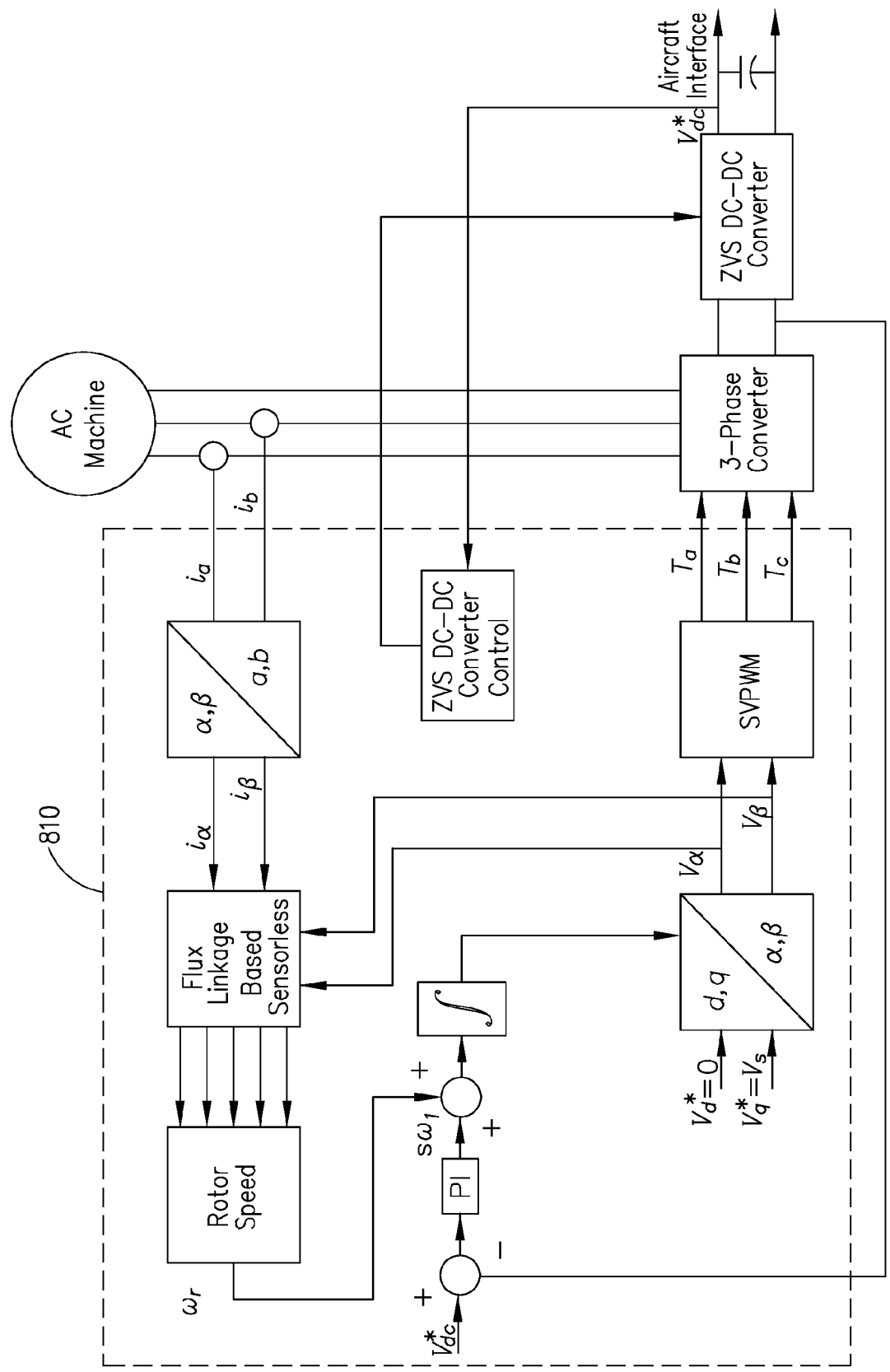

FIG. 8 is a system block diagram for the sensorless control of starter/generator induction machine 102 (in generate mode) in accordance with an exemplary embodiment of the present invention. During generate mode starter/generator induction machine 102 operates in a flux-weakening region at high speed. For this system, the battery voltage is boosted to obtain higher DC bus voltage using the boost converter stage during start mode. The converter voltage can be varied to high voltage as the back-EMF increases proportionally with the speed. In this case, to produce higher current and output higher torque such as 200% overloads, the full DC bus voltage needs to be utilized. Using the full DC bus voltage, a higher slip will produce a higher torque when the slip is changing between 0 and the pullout slip. Based on this relationship, a robust indirect field orientation control algorithm is implemented. Using feedback, the DC bus voltage is controlled to a constant value for example, but not limited to 30 Vdc and the output of the DC bus voltage P1 controller is the slip speed. At the same time—as in start mode—the rotor position and rotor speed are also estimated by the voltage-model flux-observer. The system synchronous speed is the sum of the slip speed and the estimated rotor speed. By integrating the synchronous speed, the synchronous flux-rotating angle is obtained, which is a parameter used for the field orientation control.

During operation, starter/generator induction machine 102 is controlled such that starter/generator induction machine 102 works as a generator by appropriate gating signals provided by digital control board 810. The three phase output of starter/generator induction machine 102 is applied to the input of three phase converter 804. Gated by digital control board 810, three phase AC-DC converter 804 converts the three phase AC voltage into a DC voltage that is higher than the desired output voltage of BS/G system 100. The cascaded DC-DC then bucks this internal DC bus down to the desired DC bus voltage at the output of converter 804. Unlike a conventional vector controlled three phase AC-DC converter, the rotor angle is obtained in the exemplary embodiment, by integrating the summation of the estimated rotor speed and the slip speed. The slip speed is the output of the output voltage regulator as shown. The rotor angle is then used to convert the preset voltage commands, $v^*_\alpha$ and $v^*_\beta$, to the voltage commands that are ready to be translated to the gating signals. Differently from other methods, the exemplary embodiment permits the system to maximize the output of the generator, particularly at the upper end of the operating speed.

The DC voltage at the output of the AC-DC voltage is permitted to be much higher than the output DC bus voltage due to the cascaded DC-DC converter, resulting in significant weight saving of the cable between the DC-DC converter and AC-DC converter as well as higher operating efficiency. The DC-DC converter is constructed with a soft switching mechanism built in, thus further increasing the efficiency of the system. The rotor angle is indirectly calculated by integrating the summation of the estimated speed and the slip speed, providing a robust sensor less method suited for maximizing the output of the starter/generator induction machine 102 in the generator mode without any position sensors.

The start mode requirements of starter/generator induction machine 102 and ICC unit 104 are driven by the torque requirements of the respective engine. For a wide-speed-range sensorless-control system, the parameters of the starter/generator induction machine 102 vary at different operating conditions. Generally, the current influences the inductance while the resistance changes are due to the temperature. The rotor position estimation is based on the parameters of the starter/generator induction machine 102, therefore resistance changes due to temperature are compensated for. To make the system more robust, the controller includes an adaptive parameter system and self-tuning . . . .

The battery Ah (Ampere-hour) rating is determined by the start up power requirement or the emergency power requirement. Depending on the aircraft power distribution architecture, if the battery start up requirement is driving the battery size, then a BS/G system has the potential to reduce the size and weight of the battery as well as improve the life/reliability of the battery. The BS/G also offers competitive benefits against the brush type system to control the battery peak current during the startup. ICC unit 104 of the BS/G system includes the converter/inverter stages and the DSP-based startup mode torque control algorithm, which controls the required torque (V/Hz) during start mode. This topology and control algorithm ensures that the battery current during start mode has controlled peak current. In the case of a brush type DC system, the peak current from the battery is not controlled which results in higher stress on the battery compared to a brushless system.

For the brushless system, if the external ground power is used instead of the battery, the peak current from the external source is controlled through programmed torque control algorithms inside ICC unit 104. Therefore, if the engine fails to start for multiple attempts, ICC unit 104 and starter/generator induction machine 102 experience decreased heating issues compared to that of the brush type system.

FIG. 9 is a schematic block diagram of an ICC unit 900 in accordance with an alternative embodiment of the present invention. There are two three phase sets, A1, B1, C1 and A2, B2, C2, as shown in the figure. The A1, B1, C1 set 902 is connected to the upper set 906 of the ICC, while the A2, B2, C2 set 904 is connected to the lower set 908 of the ICC. This approach not only reduces filtering for EMI but also makes packaging of the overall ICC more achievable for the profile, weight, and size optimizations.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for controlling a configuration and operation of a brushless starter/generator using sensorless commutation. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems for an engine starter/generator provides a cost-effective and reliable means for a relatively lightweight system for starting an engine and generating electrical power from the engine while running. More specifically, the methods and systems described herein facilitate controlling starting current and torque in the starter/generator during a starting mode. In addition, the above-described method and systems facilitate determining a rotor angle without using a rotor position sensor. Moreover, the addition of a second ICC doubles the ripple frequency and reduces the ripple magnitude caused by the PWM by approximately half without using any interface phase transformers (IPTs). As a result, this approach not only minimizes filtering for EMI but also makes packaging of the overall ICC more achievable for the profile, weight, and size optimizations. As a result, the method and systems described herein facilitate starting an engine and generating electrical power from the engine in a cost-effective and reliable manner.

An exemplary methods and apparatus for automatically and continuously determining the physical properties of a fuel gas at the gas control valve inlet using a flow model and determining a corresponding correction to a gas fuel flow gain are described above in detail. The apparatus illustrated is not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

The invention claimed is:

1. A starter/generator system comprising:
    a three phase squirrel cage induction machine; and
    a first three-phase inverter/converter/controller (ICC) unit operatively coupled to said three phase squirrel cage induction machine through a first electrical path, said ICC comprising:
        a three phase inverter/converter electrically coupled to said three phase squirrel cage induction machine;
        a bidirectional DC-DC converter electrically coupled to said three phase inverter/converter; and
        a digital control board configured to sensorlessly determine a rotor angle from a plurality of phase currents to the induction machine during a start mode;
    wherein during a start mode, logic in said digital control board configures said starter/generator system into a combination of an induction motor, a three phase DC-AC inverter, and a DC-DC boost converter, and during a generate mode, the logic in said digital control board configures said starter/generator system into a combination of an induction generator, a three phase AC-DC converter, and a DC-DC buck converter.

2. A starter/generator system in accordance with claim 1 wherein commutation of the three phase inverter/converter is determined using a sensorless mechanism.

3. A starter/generator system in accordance with claim 1 wherein said DC-DC boost converter is configured to boost an input power from a first voltage value to a second voltage value, the second value being greater in magnitude than the first value.

4. A starter/generator system in accordance with claim 1 wherein said digital control board is configured to:
    measure two of the three phase currents, $i_a$ and $i_b$ of the induction motor; and
    convert the per phase quantities of phase currents, $i_a$ and $i_b$ into a current $i_d$ and a current $i_q$, where $i_d$ is the current aligning with the rotor flux linkage $i_q$ is the current perpendicular to the rotor flux linkage;
    control the field of the induction motor using $i_d$; and
    control the torque of the induction motor using $i_q$.

5. A starter/generator system in accordance with claim 4 wherein said digital control board is further configured to determine a rotor angle of the induction motor using the currents, $i_a$ and $i_b$, and a first voltage command, $v^*_\alpha$ and a second voltage command $v^*_\beta$.

6. A starter/generator system in accordance with claim 4 wherein said digital control board is further configured to determine a rotor angle of the induction motor using a flux linkage method.

7. A starter/generator system in accordance with claim 1 further comprising a second three-phase inverter/converter/controller (ICC) unit operatively coupled to said three phase squirrel cage induction machine through a second electrical path parallel to said first electrical path, said second ICC comprising:
    a three phase inverter/converter electrically coupled to said three phase squirrel cage induction machine;
    a bidirectional DC-DC converter electrically coupled to said three phase inverter/converter; and
    a digital control board configured to sensorlessly determine a rotor angle from a plurality of phase currents to the induction machine during a start mode.

8. A starter/generator system in accordance with claim 1 wherein digital control board is configured to determine the rotor angle by integrating a summation of an estimated rotor speed and a slip speed.

9. A starter/generator system in accordance with claim 1 wherein digital control board is configured to determine a slip speed from an output of the output voltage regulator.

10. A starter/generator system in accordance with claim 1 wherein said digital control board is configured to convert a first preset voltage command $v^*_d$ and a second preset voltage command $v^*_q$ using the rotor angle to respective voltage commands to gate said AC-DC converter.

11. A method of controlling an engine starter/generator system for starting an engine and generating power using the engine, said method comprising:
    during a start mode:
        boosting an input voltage using a DC-DC converter;
        inverting the boosted DC voltage into a three phase AC output that drives an induction motor configured to rotate the engine;
        measuring two of the three phase currents, $i_a$ and $i_b$;
        converting phase currents, $i_a$ and $i_b$ into $i_d$ and $i_q$, where $i_d$ is the current aligning with the rotor flux linkage and $i_q$ is the current perpendicular to the rotor flux linkage;
        controlling a field of an induction machine of the starter/generator system using $i_d$;
        controlling a torque of an induction machine of the starter/generator system using $i_q$;
    during a generate mode:
        applying a three phase output of the induction machine to the input of a the three phase converter to generate a three phase AC voltage;
        converting the three phase AC voltage into a DC voltage at a first voltage magnitude greater than a predetermined output voltage magnitude of the starter/generator system;
        bucking the DC voltage down to the predetermined output voltage magnitude of the starter/generator system using a cascaded DC-DC converter.

12. A method in accordance with claim 11 further comprising determining a rotor angle by integrating a summation of an estimated rotor speed and a slip speed wherein the slip speed is the output of an output voltage regulator.

13. A method in accordance with claim 11 further comprising converting a first preset voltage command $v^*_d$ and a second preset voltage command $v^*_q$ using the rotor angle to respective voltage commands to gate said AC-DC converter.

14. A method in accordance with claim 11 further comprising gating the DC-DC converter using a digital control board.

15. A method in accordance with claim 11 wherein converting phase currents, $i_a$ and $i_b$ into $i_d$ and $i_q$, comprises converting phase currents, $i_a$ and $i_b$ into $i_d$ and $i_q$, using a flux linkage position of a rotor of the induction machine.

16. A method in accordance with claim 11 further comprising sensorlessly determining a position of a rotor of the induction machine using the currents, $i_\alpha$ and $i_\beta$, and voltage commands, $v^*_\alpha$ and $v^*_\beta$ by a flux linkage method.

* * * * *

UNITED STATES PATENT AND TRADEMARK OFFICE
CERTIFICATE OF CORRECTION

PATENT NO. : 8,030,788 B2  Page 1 of 1
APPLICATION NO. : 12/347616
DATED : October 4, 2011
INVENTOR(S) : Xu et al.

It is certified that error appears in the above-identified patent and that said Letters Patent is hereby corrected as shown below:

In column 8, lines 37-38, delete "to $i_d$ and $i_q$, Conventionally" and insert therefor
-- to $i_d$ and $I_q$. Conventionally --.

Signed and Sealed this
Twenty-first Day of February, 2012

David J. Kappos
*Director of the United States Patent and Trademark Office*